(12) United States Patent
West et al.

(10) Patent No.: US 6,841,335 B2
(45) Date of Patent: Jan. 11, 2005

(54) IMAGING MEMBERS WITH IONIC MULTIFUNCTIONAL EPOXY COMPOUNDS

(75) Inventors: Paul R. West, Fort Collins, CO (US); Jeffrey W. Leon, Rochester, NY (US); Robert E. McCovick, Rochester, NY (US); Nicki R. Miller, Fort Collins, CO (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 10/207,583

(22) Filed: Jul. 29, 2002

(65) Prior Publication Data

US 2004/0023154 A1 Feb. 5, 2004

(51) Int. Cl.[7] .................................................. G03C 1/76
(52) U.S. Cl. .................................... 430/280.1; 430/964
(58) Field of Search ....................................... 430/280.1

(56) References Cited

U.S. PATENT DOCUMENTS

| | | | |
|---|---|---|---|
| 4,973,572 A | 11/1990 | DeBoer | 503/227 |
| 5,339,737 A | 8/1994 | Lewis et al. | 101/454 |
| 5,488,025 A | 1/1996 | Martin et al. | 503/227 |
| 5,713,287 A | 2/1998 | Gelbart | 101/467 |
| 5,985,514 A | 11/1999 | Zheng et al. | |
| 6,090,524 A | 7/2000 | Deboer et al. | 430/272.1 |
| 6,159,657 A | 12/2000 | Fleming et al. | |
| 6,423,469 B1 | 7/2002 | DoMinh et al. | 430/270.1 |
| 6,451,500 B1 | 9/2002 | Leon | 430/270.1 |
| 2003/0113653 A1 * | 6/2003 | Zheng et al. | 430/138 |

FOREIGN PATENT DOCUMENTS

| | | |
|---|---|---|
| EP | 0825021 A2 | 2/1998 |
| EP | 0844080 A2 | 5/1998 |
| EP | 0 990 516 A1 | 4/2000 |
| EP | 1075942 A2 | 2/2001 |
| GB | 1 466 252 | 3/1977 |
| JP | 6194833 | 7/1994 |
| JP | 2001 31875 | 2/2001 |
| JP | 2002 307855 | 10/2002 |
| WO | WO 9937481 A1 | 7/1999 |
| WO | WO 9937482 A1 | 7/1999 |
| WO | WO 0139985 A2 | 6/2001 |

OTHER PUBLICATIONS

WPI ACC No: 2001–276096/ 200129 English Abstract of JP 2001–31875A, 2 pages, no date.

* cited by examiner

Primary Examiner—Cynthia Hamilton
(74) Attorney, Agent, or Firm—Faegre & Benson LLP

(57) ABSTRACT

An imaging member, such as a negative-working printing plate or on-press cylinder, can be prepared using a hydrophilic imaging layer comprising a hydrophilic heat-sensitive polymer containing a crosslinking agent comprising ionic groups and epoxy groups. This polymer may comprise quaternary ammonium carboxylate groups which may include at least one substituted-alkylene($C_1$–$C_3$)-phenyl group. The imaging member also includes an infrared radiation sensitive material to provide added sensitivity to heat that can be supplied by laser irradiation in the IR region. The heat-sensitive polymer may be "switchable" in response to heat, and provides a lithographic image without wet processing.

13 Claims, No Drawings

IMAGING MEMBERS WITH IONIC MULTIFUNCTIONAL EPOXY COMPOUNDS

BACKGROUND OF THE INVENTION

1. Field of the Invention

This invention relates to imaging members, such as lithographic printing plates, which contain a cross-linked hydrophilic coating. In particular, this invention relates to a method of improving the non-image performance of printing plates having an imaging layer containing a crosslinking agent having epoxy groups and ionic groups.

2. Background Information

Lithographic printing is based upon the immiscibility of oil and water, wherein an oily material or ink is preferentially retained by an imaged area and the water or fountain solution is preferentially retained by the non-imaged areas. When a suitably prepared negative working printing plate is moistened with water and ink is then applied the background or non-imaged areas retain the water and repel the ink while the imaged areas accept the ink and repel the water. The reverse holds true for positive working plates, in which the background is imaged. The ink is then transferred to the surface of a suitable substrate, such as cloth, paper or metal, thereby reproducing the image.

Very common lithographic printing plates include a metal or polymer support having thereon an imaging layer sensitive to visible or UV light. Both positive and negative-working printing plates can be prepared in this fashion. Upon exposure, and perhaps post-exposure heating, either imaged or non-imaged areas are removed using wet processing chemistries.

Thermally sensitive printing plates are less common, yet represent a steadily growing market. Currently, most of these plates utilize similar materials and similar imaging mechanisms as UV-imageable plates. For example, a thermal acid generator might be used in lieu of a photoacid generator and the same series of preheat and development steps might be employed. The main advantage of these digital plates is that the thermal imaging process is rapid and inexpensive compared to the analog process involving the creation of a mask and blanket UV exposure. While these plates can be imaged using lasers and digital information, they require wet processing using alkaline developer solutions.

Plates which do not require a separate wet processing step using a developer ("process-less" plates) are also of great interest in the art, particularly non-ablation plates. One approach toward non-process, non-ablation printing plates involves the use of "switchable polymers." These polymers will undergo thermally driven chemical reactions in which highly polar moieties are either created or destroyed under imaging conditions. This results in the storage of the imaging data as hydrophilic and hydrophobic regions of a continuous polymer surface. In addition to not needing wet processing, such plates have the advantage of not needing any type of material collection devices which ablation-based plates require. Also, unlike ablation plates, a switchable polymer plate in its ideal form would consist of one layer and can be manufactured on a single pass through a coating machine.

Although a number of switchable polymer-based printing plates are known, there remain technical barriers toward the utilization of this technology in commercially feasible products. Three difficulties commonly experienced in the design of switchable polymer-based plates are physical wear of the plates, and the related problems of background scumming and blanket toning. In particular, the problems of scumming, also known as "toning", and blanket toning typically result if ink-rejecting areas of the plate are not sufficiently polar. The uptake of ink in undesired areas of the plate results in the consequent undesirable transfer of ink to the final prints. Scumming may occur in both negative-working plates, in nonimaged areas, and positive plates, in imaged areas. The related problem of blanket toning refers to the buildup of ink in the background areas of the printing press blanket cylinder. Excessive blanket toning results in the necessity of periodically stopping a press run to manually clean the ink from the blanket. This can have a negative impact on the productivity of a printing process.

In switchable polymer-based printing plates, a major challenge lies in the creation of a synthetic polymer surface that has both adequate physical toughness and resistance to toning. In general, surfaces that reject ink well tend to be very highly hydrophilic and thus when exposed to an aqueous fountain solution they may be dissolved and lose adhesion to the support substrate. Alternatively, they may swell and become prone to abrasion and wear. It can be expected, then, that many of the synthetic polymer surfaces that are most resistant to toning will also have inherently inadequate physical properties for use in long-run printing plates. It is not uncommon that approaches to improve a switchable polymer plate's scumming behavior by increasing the hydrophilicity of the imageable layer will result in a consequent decrease in the wear resistance of the plate. Similarly, efforts to improve the physical toughness of a plate can result in an increase in scumming propensity.

Coatings cross-linked with compounds containing one or more epoxy groups (herein referred to as "epoxy compounds") have been used in "process-less" printing plates which can be thermally imaged. For example, WO 01/39985 describes imaging members that require no wet processing after imaging. Other thermal imaging compositions containing epoxy resins are described in EP 1 075 942 and in JP 2001-31875.

None of the prior art discloses printing plates containing a crosslinking agent having epoxy groups and ionic groups. Accordingly, the present invention is directed to imaging members, preferably printing plates, containing an imaging layer comprising as crosslinking agents which contain a plurality of epoxy groups and one or more ionic group. These cross-linking agents improve the background performance of printing plates, preferably of printing plates which contain polymers comprising ionic groups. Moreover, the cross-linking agents can be incorporated in high concentrations into coatings without adversely affecting the ability to keep non-printing areas clean.

SUMMARY OF THE INVENTION

Accordingly, it is an object of this invention to provide an imaging member prepared by a method comprising the steps of: (a) providing a substrate; (b) coating the substrate with an imaging layer, wherein the imaging layer comprises (i) a hydrophilic heat-sensitive polymer, (ii) a crosslinking agent comprising one or more ionic groups and a plurality of epoxy groups, and (iii) a photothermal conversion material; and (c) imagewise exposing the imaging layer to energy to provide exposed and unexposed areas in the imaging layer.

It is another object of this invention to provide a method of imaging comprising the steps of: (a) providing a substrate; (b) coating the substrate with an imaging layer, wherein the imaging layer comprises (i) a hydrophilic heat-sensitive polymer, (ii) a crosslinking agent comprising one or more ionic groups and a plurality of epoxy groups, and (iii) a photothermal conversion material; and (c) imagewise exposing the imaging layer to energy to provide an imaging member comprising exposed and unexposed areas in the imaging layer.

It is another object of this invention to provide a method of printing comprising the steps of: (a) providing a substrate; (b) coating the substrate with an imaging layer, wherein the imaging layer comprises (i) a hydrophilic heat-sensitive polymer, (ii) a crosslinking agent comprising one or more ionic groups and a plurality of epoxy groups, and (iii) a photothermal conversion material; (c) imagewise exposing the imaging layer to energy to provide an imaging member comprising exposed and unexposed areas in the imaging layer; and d) contacting the imaging member with a lithographic printing ink in the presence of water or a fountain solution.

It is another object of the invention to provide a coating composition comprising: (i) a hydrophilic heat-sensitive polymer; (ii) a crosslinking agent comprising one or more ionic groups and a plurality of epoxy groups; and (iii) a photothermal conversion material.

It is another object of this invention to provide a printing plate precursor prepared by a method comprising: (a) providing a substrate; and (b) coating the substrate with an imaging layer, wherein the imaging layer comprises (i) a hydrophilic heat-sensitive polymer, (ii) a crosslinking agent comprising one or more ionic groups and a plurality of epoxy groups, and (iii) a photothermal conversion material.

The present invention has the advantage of achieving a desired level of crosslinking without affecting background sensitivity. The non-ionic epoxy compounds of the prior art degrade the differentiation between image and non-image areas as the concentration of the non-ionic epoxy compounds in the coating increases. In contrast, the compounds of the present invention afford improved background sensitivity performance and a decreased tendency for filling in of shadows.

DETAILED DESCRIPTION OF THE INVENTION

The crosslinking agents of the invention can be obtained from epoxy-containing "precursor compounds" that are branched or unbranched, monomeric, oligomeric, or polymeric compounds which preferably comprise at least 25% by weight of oxygen with the remainder of the weight comprising of aliphatic hydrocarbon and residual aliphatic haloalkyl groups (usually chloroalkyl groups). The oxygen atoms are covalently bound within the precursor compound as hydroxy, aliphatic ether, epoxy, or aliphatic ester moieties. Preferably, all non-epoxy moieties are either hydroxy or aliphatic ether groups. Preferably, the percentage of oxygen (by weight) in the precursor compounds is from about 30% to about 50%. It would be apparent to one skilled in the art that the backbones of the epoxy compounds of this invention and the precursor compounds have essentially the same percentage of oxygen. For purposes of this invention, "backbone" refers to the compounds that result if the charged moiety is severed from the remainder of the compounds at the carbon-heteroatom bond connecting the charged moiety and a hydrogen atom is added to provide stoichiometry.

In some embodiments of the invention, there are no aromatic groups in the backbone of the compounds of this invention (either aromatic carbocyclic or heterocyclic groups).

Furthermore, the precursor compounds are soluble in water or water-miscible solvents such as various alcohols (such as methanol, ethanol, and propanol), tetrahydrofuran, acetonitrile, acetone, glycols (such as ethylene glycol and diethylene glycol), and methyl ethyl ketone.

Preferred precursor compounds are glycidylated carbohydrates and glycidylated polyglycerols. More particularly, representative branched or unbranched precursor compounds used to prepare the compounds of this invention are identified below as Precursors I, II, III, and IV, and Precursors I and II are most preferred:

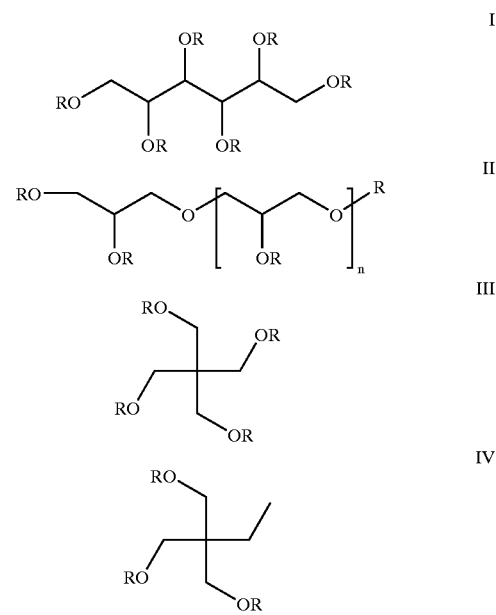

In these compounds, the R groups can be the same or different in each molecule and can be either hydrogen or a glycidyl moiety

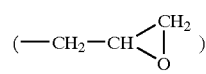

as long as at least two R groups are glycidyl moieties. Furthermore, Precursors I–IV are also intended to represent branched variations of the simplified linear structures that are illustrated as well as oligomeric species that are formed by intermolecular coupling reactions. It should also be noted that certain methods of preparation of the compounds of this invention result in the presence of haloalkyl residues (in particular, R—CH$_2$Cl groups) as common byproducts. Though these units are not shown in the simplified structures in FIG. I, their presence in the structures described herein is implied throughout this document and in the descriptions herein.

In Precursor II, n is generally from 1 to 10, and preferably from 2 to 6.

Most preferred precursor compounds include but are not limited to the following materials: glycidyl ethers of sorbitol (Precursor I, sold by Esprix Technologies under the tradename of CR-5L and by Nagase Chemicals under the tradename of EX-611), or other reduced or non-reduced sugars, polysaccharides, or of cellulosics, polyglycerol glycidyl ethers (Precursor II, sold by Nagase Chemicals under the trademark of Denacol® EX-521 and EX-512), pentaerythritol polyglycidyl ethers (Precursor III, sold by Nagase Chemicals under the trademark of Denacol® EX-313 and EX-314), trimethylolpropane polyglycidyl ethers (Precursor IV), glycerol polyglycidyl ethers, poly(ethylene glycol) diglycidyl ethers, glycidyl ethers of poly(vinyl alcohol), and poly(propylene glycol) diglycidyl ether.

Another common class of materials useful as epoxy-containing precursor compounds are glycidyl ethers and polyglycidyl ethers of bisphenol compounds. These industrially important resins are sold by Shell Chemicals under the EPON brand name. The bisphenol may be, but not necessarily limited to 4,4'-isopropylidenebisphenol, 4,4'-methanebisphenol; 4,4'-sulfonylbisphenol, 4,4'-ethylidenebisphenol, 4,4'-isopropylidenebis(2,6-dimethylphenol), 4,4'-cyclohexylidenebisphenol, 4,4'-(1,4-phenylenediisopropylidene)bisphenol, 4,4'-(1,3-phenylenediisopropylidene)-bisphenol, 4,4'-(1-phenylethylidene)bisphenol, and 1,5-dihydroxynaphthalene. These resins are typically produced by etherification of a polyphenol with epichlorohydrin in the presence of alkali. When more than one equivalent of epichlorohydrin is reacted with each phenol unit, repeating glycerol ether linkages will be present between the phenolic unit and the terminal glycidyl unit. For example, such a resin synthesized from 4,4'-isopropylidenebisphenol will have the following structure, where n is commonly between 0 and 50.

monium moieties as illustrated in the following Structures V, VI, and VII, respectively:

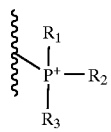

V

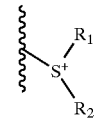

VI

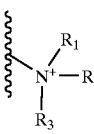

VII $R_1$, $R_2$, and $R_3$ are independently substituted or unsubstituted alkyl groups having 1 to 12 carbon atoms (such as methyl, ethyl, n-propyl, iso-propyl, hexyl, hydroxymethyl, cyanomethyl, methylenecarboxyalkyl, and dodecyl groups),

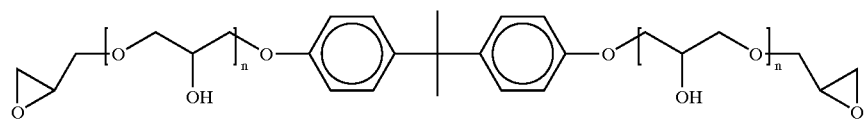

Another class of epoxy-containing compounds useful as precursor compounds includes glycidyl ethers of phenol-formaldehyde resins such as novolacs and resoles.

Other common classes of precursor compounds are polyglycidyl ethers of polyhydric alcohols and polyglycidyl esters of polycarboxylic acids. The former category may be derived from such alcohols as ethylene glycol, diethylene glycol, triethylene glycol, 1,2,6-hexanetriol, glycerol, cyclohexanedimethanol, sorbitol, trimethylolpropane, pentaerythritol, and similar compounds. Examples of the latter category include esters of oxalic acid, succinic acid, pyromellitic acid, mellitic acid, maleic acid, and adipic acid.

The compounds of this invention generally have an average molecular weight of from about 250 to about 1,000,000 daltons. Preferably, the average molecular weight will be from about 250 to about 200,000 daltons, and more preferably, from about 274 to about 20,000 daltons.

It should be noted that, when a nucleophile is reacted with a glycidyl unit on one of the precursor compounds, substitution will occur most commonly at the least hindered (terminal) oxirane methylene carbon. However, multiple substitutions at other positions can also occur. The precursor compounds described herein are intended to include epoxy resins in which nucleophilic substitution has occurred at either position of the oxirane ring.

The compounds of this invention will contain, on average, two or more epoxy moieties and one or more ionic moieties.

In one embodiment of the invention, the ionic moieties are the noted organoonium moieties described below. It will be noted that where the compounds include two or more organoonium moieties in the same molecule, those organoonium moieties can be the same or different. In addition, the compound may contain pendant hydroxyl groups.

Useful organoonium moieties include organophosphonium moieties, organosulfonium moieties, and organoamsubstituted or unsubstituted carbocyclic or heterocyclic aryl groups having 5 to 10 carbon and/or heteroatoms in the ring (such as phenyl, naphthyl, pyridinyl, tetrahydropyranyl, tetrahydrofuranyl, and p-methylphenyl), and substituted or unsubstituted cycloalkyl groups having from 5 to 10 carbon atoms in the carbocyclic ring (such as 1,3- and 1,4-cyclohexyl groups). Alternatively, any two of $R_1$, $R_2$, and $R_3$ can be combined to form a substituted or unsubstituted heterocyclic ring with the charged phosphorus, sulfur or nitrogen atom, the ring having 4 to 8 atoms in the ring. Such heterocyclic rings include, but are not limited to, substituted or unsubstituted morpholinium, piperidinium, pyrrolidinium, quinuclidine, tetrahydrothiophene, tetrahydrothiopyran, phospholane, and phosphinane groups. The various groups can also include one or more oxy, thio, carbonyl, amido, or alkoxycarbonyl groups.

Preferred $R_1$, $R_2$, and $R_3$ groups are substituted and unsubstituted alkyl groups having 1 to 3 carbon atoms, and methyl and ethyl groups are more preferred. When two or more of $R_1$, $R_2$, and $R_3$ are combined, preferably, they are combined to form 5- or 6-membered rings.

In addition, $R_1$, $R_2$, and $R_3$ can contain additional organoonium groups as substituents. For example, $R_1$, $R_2$, or $R_3$ can be a trimethylammoniomethyl group or a dimethylsulfoniomethyl group, thereby giving a pendant group with a net charge of +2.

Additional organoonium moieties useful in the practice of this invention are N-alkylated positively charged nitrogen-containing heterocyclic moieties that can be represented by the following Structure VIII:

VIII

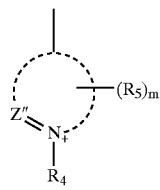

In Structure VIII, $R_4$ is a branched or unbranched, substituted or unsubstituted alkyl group having from 1 to 12 carbon atoms (such as methyl, ethyl, n-propyl, iso-propyl, t-butyl, hexyl, methoxymethyl, benzyl, neopentyl, and dodecyl) or carbocyclic or heterocyclic aryl groups (as defined above). Preferably, $R_4$ is a substituted or unsubstituted, branched or unbranched alkyl group having from 1 to 6 carbon atoms, and most preferably, it is substituted or unsubstituted methyl group.

$R_5$ can be a substituted or unsubstituted alkyl group (as defined above, and additionally a cyanoalkyl group, a hydroxyalkyl group or alkoxyalkyl group), substituted or unsubstituted alkoxy having 1 to 6 carbon atoms (such as methoxy, ethoxy, isopropoxy, oxymethylmethoxy, n-propoxy, and butoxy), halo (such as chloro and bromo), a substituted or unsubstituted carbocyclic or heterocyclic aryl group (as defined above), a substituted or unsubstituted cycloalkyl group having 5 to 8 carbon atoms in the ring (such as cyclopentyl, 1,3-, or 1,4-cyclohexyl, and 4-methylcyclohexyl), or a substituted or unsubstituted non-aromatic heterocyclic group having 5 to 8 atoms in the ring including at least one nitrogen, sulfur, or oxygen atom in the ring (such as pyridyl, pyridinyl, tetrahydrofuranyl, and tetrahydropyranyl). Preferably, $R_5$ is substituted or unsubstituted methyl or ethyl group.

Z" represents the carbon and any additional nitrogen, oxygen, or sulfur atoms necessary to complete the 5- to 10-membered aromatic N-heterocyclic ring that is attached to the polymeric backbone. Thus, the ring can include two or more nitrogen atoms in the ring (for example, N-alkylated diazinium or imidazolium groups), or N-alkylated nitrogen-containing fused ring systems including, but not limited to, substituted or unsubstituted pyridinium, quinolinium, iso-quinolinium acridinium, phenanthradinium, and other groups readily apparent to one skilled in the art. Preferred groups of this type are pyridinium groups.

Also in Structure VIII, m is 0 to 6, and it is preferably 0 or 1. Most preferably, m is 0.

The most preferred compounds of this invention that include organoonium moieties are represented by the following Structures C, D, E, F, and G in which the organoonium moieties are attached to the compound backbone.

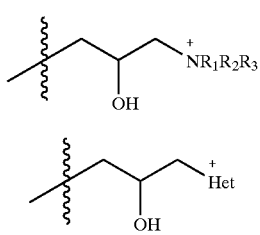

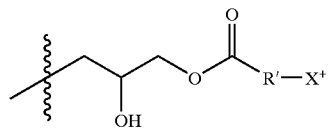

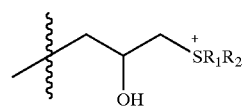

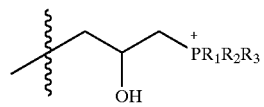

In Structures C–G, R', $R_1$, $R_2$, and $R_3$ are as defined above, "Het" represents an N-alkylated heterocyclic group illustrated in Structure VIII above, and $X^+$ can be any of the organoonium groups described herein.

R' is a divalent unreactive organic linking group capable of connecting the ester unit to the organoonium moiety. Preferably, R' is a substituted or unsubstituted alkylene or cycloalkylene group, and most preferably, it is a substituted or unsubstituted alkylene having 1 to 3 carbon atoms.

While the compounds containing organoonium moieties will contain one or more or the same or different organoonium moieties and two or more epoxy moieties, preferably, the molar ratio of epoxy moieties to organoonium moieties is from about 19:1 to about 1:19. More preferably, this molar ratio will range from about 4:1 to about 1:4.

The cationic epoxy compounds of this invention are synthesized by chemical modification of the epoxy-containing precursor compounds. Generally, one or more neutral, nucleophilic heteroatom compounds (such as trialkyl amines, dialkyl sulfides, trialkyl phosphines, or nucleophilic, nitrogen-containing heterocycles) and a protic acid (one equivalent of protic acid per equivalent of nucleophilic compound) will be combined with the precursor compound in water, a water-miscible organic solvent, or a mixture thereof. The protic acid can be any organic or mineral acid with a sufficiently non-nucleophilic, non-reactive conjugate base. Hydrochloric acid is a preferred protic acid.

The amount of the neutral, nucleophilic heteroatom compound will be such that complete conversion will afford a compound that will contain more than one epoxy moiety and at least one cationic organoonium moiety per average molecule. Reaction temperatures will generally range from room temperature to 100° C. More commonly, the reaction temperature will be from about 40 to about 60° C. The reactions will typically be run at 5–90% solids. It has been found, however, that at reactions carried out at 10–20% solids and temperatures of less than 60° C. provide optimal conversions (yield) with minimal growth of molecular weight and very little, if any, gelation. The reaction can be conveniently monitored by observing the disappearance of the oxirane protons using proton NMR or by monitoring the disappearance of the nucleophilic heteroatom compound by gas chromatography or ion chromatography. The desired compound can be stored and used in solution in the reaction solvent. Alternately, the solvents can be stripped under vacuum to afford the desired compound resin or the desired compound can be isolated by precipitation into an appropriate non-solvent.

In another embodiment of this invention, the epoxy-containing precursor compound can be reacted via the method described above with a reactant compound containing an organoonium group linked to a carboxylic acid. In this case, a protic acid is not needed. An example of such a reactant compound is betaine hydrochloride. Such a reaction will afford a cationic compound in which the organoonium group is linked to the backbone by an ester linkage to afford a compound that contains pendant moieties identified as Structure E.

It is also possible to prepare and use a mixture of two or more water-soluble or water-dispersible, branched or unbranched compounds. The compounds would comprise the same or different backbones, each backbone having covalently attached thereto, two or more epoxy moieties and one or more of the same or different organoonium moieties. This mixture of compounds can be prepared by reacting a mixture of precursor compounds noted above with the appropriate amounts and types of reactants, depending upon the reaction scheme that is used. The mixture of compounds can be isolated or used in solution.

As noted above, the compounds of this invention are water-soluble or water-dispersible. By "water-soluble" is meant that at 60° C., a 2% (by weight) solution of the compound yields a clear solution in water from which no more than 5% of the compound can be recovered by filtration. By "water-dispersible" is meant that at least 2% (by weight) of the compound can be dispersed in water at room temperature without the use of an emulsifying agent to provide a two-phase system that exhibits no observable settling of the solid phase or phase separation after one hour.

The compounds of the present invention may be prepared or used as heterogeneous mixtures, and such mixtures may have both water-soluble and water-dispersible fractions.

In another embodiment of the invention, the ionic moieties are anionic moieties. Preferably, the anionic moieties are sulfonate (—SO$_3^-$) or thiosulfate (—SSO$_3^-$) moieties as described below. It will be noted that where the compounds include two or more anionic moieties in the same molecule, those moieties can be the same or different. In addition, the compound may contain pendant hydroxyl groups. The compounds can also include appropriate monovalent cations such as hydrogen, alkali metal ions, ammonium ions, alkaline earth metal ions, or any other metal ions readily apparent to a skilled worker in the art.

It is also apparent that the compounds that contain anionic moieties of this invention can have a net negative charge or a net neutral charge if they are zwitterionic in nature. Preferably, the epoxy compounds have a net negative charge.

The most preferred compounds that contain anionic moieties include sulfate or thiosulfate moieties as represented by the following Structures H, I, J, and K in which the anionic moieties are attached to the compound backbone:

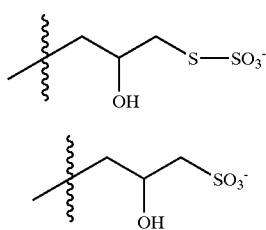

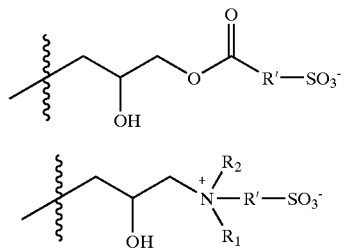

In Structures H–K, R", R$_6$ and R$_7$ are defined as follows.

R$_6$ and R$_7$ are independently substituted or unsubstituted alkyl groups having 1 to 12 carbon atoms (such as methyl, ethyl, n-propyl, iso-propyl, hexyl, hydroxymethyl, cyanomethyl, methylenecarboxyalkyl, and dodecyl groups), substituted or unsubstituted carbocyclic or heterocyclic aryl groups having 5 to 10 carbon and/or heteroatoms in the ring (such as phenyl, naphthyl, pyridinyl, tolyl, tetrahydropyranyl, and p-methylphenyl), and substituted or unsubstituted cycloalkyl groups having from 5 to 10 carbon atoms in the carbocyclic ring (such as 1,3- and 1,4-cyclohexyl groups). Alternatively, R$_6$ and R$_7$ can be combined to form a substituted or unsubstituted heterocyclic ring with the charged nitrogen atom, the ring having 4 to 8 atoms in the ring. Such heterocyclic rings include, but are not limited to, substituted or unsubstituted morpholinium, piperidinium, and pyrrolidinium groups. The various groups can also include one or more oxy, thio, carbonyl, amido, or alkoxycarbonyl groups.

Preferred R$_6$ and R$_7$ groups are substituted and unsubstituted alkyl groups having 1 to 3 carbon atoms, and methyl and ethyl groups are more preferred. When R$_6$ and R$_7$ are combined, preferably, they are combined to form morpholinium or pip eridinium groups.

In addition, R$_6$ and R$_7$ can contain additional sulfonate or thiosulfate groups as substituents, thereby giving a pendant group with a net charge of –2.

R" can be any divalent linking group (substituted or unsubstituted) that includes one or more carbon atoms and one or more heteroatoms such as oxygen, nitrogen, and sulfur atoms in the linking chain sufficient to link the carbonyl group (in the case of Structure J) or the quaternary ammonium nitrogen (in the case of Structure K) to the sulfonate or thiosulfate group. The linking group can include one or more divalent acyclic or cyclic groups such as aliphatic groups, arylene groups, or heterocyclic groups, in any combination, and any heteroatom linking groups such as oxy, thio, amido, carbonyl, carbonyloxy, sulfonamido, and others readily apparent to one skilled in the art that are chemically possible in such compounds. For Structures J and K, the preferred linking groups are substituted or unsubstituted alkylene groups having 1 to 5 carbon atoms. More preferably, for Structure J, the linking group is methylene and for Structure K, the linking groups are unsubstituted alkylenes having 2 to 5 carbon atoms.

While the compounds that contain anionic moieties will contain one or more or the same or different anionic moieties and two or more epoxy moieties, preferably, the molar ratio of epoxy moieties to anionic moieties is from about 19:1 to about 1:19. More preferably, this molar ratio will range from about 4:1 to about 1:4.

The epoxy compounds that contain anionic moieties are synthesized by the reaction of a nucleophilic reagent with the epoxy-containing precursor compound. The amount of the nucleophilic compound will be such that complete conversion will afford a desired product that will contain at least two epoxy moieties and at least one anionic moiety per average molecule. Reaction temperatures will typically range from room temperature to 100° C. More commonly, the temperature will range from about 40° C. to about 60° C. The reactions will typically be run at from about 5% to about 90% solids. It has been found, however, that at 10–20% solids and temperatures of less than 60° C., excellent conversions (yields) can be attained with minimal growth of molecular weight and very little, if any, gelation. The reaction can be conveniently monitored by observing the disappearance of the oxirane protons using proton NMR, by monitoring the disappearance of the nucleophilic compound by ion chromatography, or by measuring a change in pH. The product compound can be stored and used in solution in the reaction solvent. Alternatively, the solvents can be stripped under vacuum to afford the desired compound or the pure compound can be isolated by precipitation into a non-solvent. The solvent system used may be water or a combination of water and any water-miscible solvents sufficient to solubilize the product compound and allow for at least marginal solubility of the reactants. Water-methanol is a preferred solvent combination.

To yield an epoxy compound comprising thiosulfate moieties (Structure H noted above), an epoxy-containing precursor compound can be reacted with the thiosulfate salt of an inert cation. The thiosulfate salt will preferably be sodium, potassium, or a quaternary ammonium thiosulfate. As the reaction progresses, the pH of the reaction mixture will rise. Thus, the extent of reaction can be easily monitored using a pH meter. A protic acid, in an amount equimolar to the thiosulfate, will need to be gradually added over the course of the reaction. Any acid with a relatively non-nucleophilic anion can be used for this purpose but hydrochloric acid is preferred. A byproduct of this reaction will be the resultant salt of the anion of the added acid with the cation of the thiosulfate. If needed, the product compound can be purified by the evaporation of the solvents under reduced pressure, followed by redissolution in an organic solvent (such as methanol). In most cases, the salt can then be filtered out as an undissolved solid. The resulting compounds can also be identified as "Bunte" salts.

To yield an epoxy compound functionalized with a sulfonate unit (Structure I noted above), an epoxy-containing precursor compound can be reacted with the bisulfite salt of an inert cation. The bisulfite salt will preferably be sodium, potassium, or a quaternary ammonium bisulfite. As bisulfite is a weaker nucleophile than thiosulfate, it is often useful to add an iodide salt (about 5–25 mol % based on bisulfite) as a catalyst. The resulting iodide salt can be removed in the same manner as described for the removal of salts from the thiosulfate-containing compounds. This reaction can be conveniently monitored by the change in pH. For a typical reaction in 1:1 methanol-water of approximately 10–20% solids, the pH will change from about 5 to about 9–11 as the reaction progresses. Alternatively, a sulfite salt can be used as the nucleophile and one equivalent of a protic acid can be added to control the rise in pH as the reaction progresses.

In another synthetic embodiment, an epoxy precursor compound can be reacted via the method described above with a compound containing a sulfonic acid or sulfonate salt linked to a tertiary amine or a nitrogen-containing heterocycle. Examples of such compounds are morpholinoethane sulfonic acid (and the conjugate bases thereof) and pyridinoethane sulfonic acid (and the conjugate base thereof, 2 and 4 isomers). Such a reaction will provide a zwitterionic compound in which the sulfonate group is linked to the backbone by quaternary ammonium or positively charged nitrogen heterocycle unit and any number of other linking and spacer groups (such as alkyl, ester, or amide) to provide a compound that contains pendant $R_6$ and $R_7$ groups as shown in Structure K noted above. The linking group R" is identified above and can comprise any combination of chemical units (such as linear or cyclic alkyl, aryl, ether, thioether, ester, or amide groups, etc.) sufficient to covalently connect the sulfonate to the nitrogen of the quaternary ammonium or heterocycle moiety.

In yet another embodiment, an epoxy precursor compound is reacted via the method described above with a compound containing a sulfonate linked to a carboxylic acid. An example of such a compound is 3-sulfopropionic acid and its conjugate bases. Such a reaction will afford a compound in which the sulfonate group is linked to the backbone by an ester linkage to afford a compound that contains pendant groups shown in Structure J (noted above). The linking group R" is defined above.

It is also possible to prepare and use a mixture of two or more water-soluble or water-dispersible, branched or unbranched compounds. The compounds would comprise the same or different backbones, each backbone having covalently attached thereto, two or more epoxy moieties and one or more of the same or different sulfonate or thiosulfate moieties. This mixture of compounds can be prepared by reacting a mixture of precursor compounds noted above with the appropriate amounts and types of reactants, depending upon the reaction scheme that is used. The mixture of compounds can be isolated or used in solution. Preferably, in such mixtures, all of the epoxy compounds have a net negative charge.

The hydrophilic heat-sensitive polymer of the invention is a polymer that is suitable for crosslinking. In one embodiment of the invention, the polymer may be any polymer containing a nucleophilic moiety capable of reacting with the epoxy functionality of the crosslinking agents of the invention. In another embodiment of the invention, the crosslinking agent comprising one or more ionic groups and a plurality of epoxy groups may be self-crosslinking. In this embodiment of the invention, the hydrophilic heat-sensitive polymer is believed to be trapped within a crosslinked species.

In one embodiment of the invention, the hydrophilic heat-sensitive polymers of the invention are polymers that do not comprise carboxylate groups. In one preferred embodiment, the polymers are non-ionic polymers wherein the solubility of the non-ionic polymers in aqueous solution decreases upon irradiation with infrared radiation. In another preferred embodiment, the polymers are ionic polymers comprising a plurality of thiosulfate groups.

In another embodiment of the invention, the hydrophilic heat-sensitive polymers of the present invention comprise ionic groups and may be "switchable" in response to heat. In one preferred embodiment, the polymers comprise carboxylate groups, wherein the carboxylate groups are linked either directly or indirectly to the polymer backbone. Preferably, the carboxylate groups are directly attached to the backbone. More preferably, the carboxylate groups are quaternary ammonium carboxylate groups. These polymers can be obtained by reacting any carboxylic acid-containing polymer (or a polymer containing equivalent groups, such as anhydrides) with a quaternary ammonium hydroxide that contains a substituted alkylene($C_1$–$C_3$)-phenyl group. The heat-sensitive polymer, when formulated with a photothermal conversion material and a crosslinking agent, provides a mechanically durable infrared radiation sensitive imaging member that exhibits excellent resistance to scumming and blanket toning.

The ammonium cations used in the heat-sensitive polymers include one or more unsubstituted or substituted-alkylene($C_1$–$C_3$)-phenyl groups, preferably benzyl groups, and the result is improved imaging speed and roll-up over many of the heat-sensitive polymers described in U.S. application Ser. No. 09/454,151, discussed above, that do not have such groups. The one or more noted alkylenephenyl groups comprise one or more substituents on either or both of the alkylene and phenyl moieties. As described in more detail below, the substitution can be of any of a wide variety of patterns and chemical components.

The ammonium carboxylate-containing units, or equivalent anhydride units, are denoted as "A" in Structure 1 below; recurring non-ionic non-carboxylated units may also be present and are denoted as "B" in Structure 1 below. The polymer may also comprise a combination of units "A" and "B".

The recurring carboxylate-containing units in this embodiment of the invention are linked directly to the polymer backbone or are connected by spacer units identified as "X" as shown in Structure 1 below, where y can be 0 or 1. This spacer unit can be any divalent aliphatic, alicyclic or aromatic group that does not adversely affect the polymer's heat-sensitivity. For example, "X" can be a substituted or unsubstituted alkylene group having 1 to 16 carbon atoms, such as methylene, ethylene, isopropylene, n-propylene and n-butylene; a substituted or unsubstituted arylene group having 6 to 10 carbon atoms in the arylene ring, such as m- or p-phenylene and naphthylenes; substituted or unsubstituted combinations of alkylene and arylene groups, such as arylenealkylene, arylenealkylenearylene and alkylenearylenealkylene groups; and substituted or unsubstituted N-containing heterocyclic groups. Any of these defined groups can be connected in a chain with one or more amino, carbonamido, oxy, thio, amido, oxycarbonyl, aminocarbonyl, alkoxycarbonyl, alkanoyloxy, alkanoylamino or alkaminocarbonyl groups. Particularly useful "X" spacers contains an ester or amide connected to an alkylene group or arylene group as defined above, as is the case when the ester and amide groups are directed bonded to "A".

Structure 1

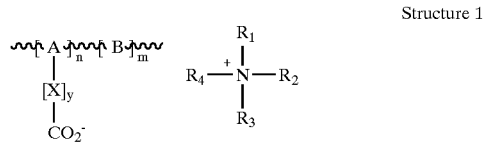

Additional non-ionic non-carboxylate monomers that provide the recurring units represented by "B" in Structure 1 above include any useful hydrophilic or oleophilic ethylenically unsaturated polymerizable comonomers that may provide desired physical or printing properties of the surface imaging layer or which provide crosslinkable functionalities. One or more "B" monomers may be used to provide these recurring units, including but not limited to, acrylates, methacrylates, styrene and its derivatives, acrylamides, methacrylamides, olefins, vinyl halides, vinyl ethers, and any monomers or precursor monomers that contain carboxy groups (that are not quaternized).

The quaternary ammonium carboxylate-containing polymers may be derived from a variety of polymers and copolymer classes including, but not necessarily limited to polyamic acids, polyesters, polyamides, polyurethanes, silicones, proteins, such as modified gelatins, polypeptides, and polymers and copolymers based on ethylenically unsaturated polymerizable monomers such as acrylates, methacrylates, acrylamides, methacrylamides, vinyl ethers, vinyl esters, alkyl vinyl ethers, maleic acid/anhydride, itaconic acid/anhydride, styrenics, acrylonitrile, and olefins such as butadiene, isoprene, propylene, and ethylene. A carboxylic acid-containing polymer (that is, one that is reacted to form quaternary ammonium carboxylate groups) may contain more than one type of carboxylic acid-containing monomer. Certain monomers, such as maleic acid/anhydride and itaconic acid/anhydride may contain more than one carboxylic acid unit. Preferably, the parent carboxylic acid-containing polymer is an addition polymer or copolymer containing acrylic acid, methacrylic acid, maleic acid or anhydride, or itaconic acid or anhydride or a conjugate base or hydrolysis product thereof.

In Structure 1, n preferably ranges from about 25 to 100 mol %, more preferably from about 50 to 100 mol %, and m preferably ranges from 0 to about 75 mol %, more preferably from 0 to about 50 mol %.

While Structure 1 could be interpreted to show polymers derived from only two ethylenically unsaturated polymerizable monomers, it is intended to include terpolymers and other polymers derived from more than two monomers.

The quaternary ammonium carboxylate groups, if present, are present in such a quantity as to provide a minimum of one mole of the quaternary ammonium carboxylate groups per 1000 g of polymer and a maximum of one mole of quaternary ammonium carboxylate groups per 45 g of polymer. Preferably, the ratio of moles of quaternary ammonium carboxylate groups to grams of polymer is from about 1:500 to about 1:45, more preferably from about 1:300 to about 1:45. This parameter is readily determined from a knowledge of the molecular formula of a given polymer and the monomeric starting materials or standard titrimetric or spectrometric methods.

The quaternary ammonium counterion of the carboxylate groups in this embodiment of the invention may be any ammonium ion in which the nitrogen is covalently bound to a total of four alkyl or aryl substituents as defined below, provided at least one of the four substituents is a substituted-alkylene($C_1$–$C_3$)phenyl group.

More particularly, in Structure 1 noted above, $R_1$, $R_2$ and $R_3$ are independently substituted or unsubstituted alkyl groups having 1 to 12 carbon atoms, such as methyl, ethyl, n-propyl, isopropyl, t-butyl, hexyl, methoxy, trichloromethyl, hydroxyethyl, 2-propanonyl, ethoxycarbonylmethyl, benzyl, substituted benzyl such as 4-methoxybenzyl, o-bromobenzyl, and p-trifluoromethylbenzyl, and cyanoalkyl; or substituted or unsubstituted aryl groups having 6 to 14 carbon atoms in the carbocyclic ring, such as phenyl, naphthyl, xylyl, p-methoxyphenyl, p-methylphenyl, m-methoxyphenyl, p-chlorophenyl, p-methylthiophenyl, p-N,N-dimethylaminophenyl, methoxycarbonylphenyl and cyanophenyl. Alternatively, any two or all three of $R_1$, $R_2$ and $R_3$ can be combined to form a ring (or two rings for four substituents) with the quaternary nitrogen atom, the ring having 5 to 14 carbon, oxygen, sulfur and nitrogen atoms in the ring. Such rings include, but are not limited to, morpholine, piperidine, pyrrolidine, carbazole, indoline and isoindoline rings. The nitrogen atom can also be located at the tertiary position of the fused ring. Other useful substituents for these various groups would be readily apparent to one skilled in the art, and any combinations of the expressly described substituents are also contemplated.

Alternatively, multi-cationic ionic species containing more than one quaternary ammonium unit covalently bonded together and having charges greater than +1, such as +2 for diammonium ions and +3 for triammonium ions, may be used in this invention.

Preferably, $R_1$, $R_2$ and $R_3$ are independently linear or branched unsubstituted alkyl groups of 1 to 3 carbon atoms, or linear or branched hydroxyalkyl groups of 1 to 3 carbon atoms that comprise 1 to 3 hydroxy groups as the only substituents, preferably with only one hydroxy group per carbon atom. More preferably, these radicals are independently methyl, hydroxymethyl, ethyl, 2-hydroxyethyl, 1-hydroxyethyl or 1,2-dihydroxyethyl, and most preferably, they are either methyl or 2-hydroxyethyl.

$R_4$ is either an unsubstituted alkylenephenyl group or a substituted alkylenephenyl group that has at least one substituent on either the alkylene or phenyl moiety of the group. More preferably, the one or more substituents are on the phenyl moiety. The alkylene moiety can be linear or branched in nature and has from 1 to 3 carbon atoms. Examples include methylene, ethylene, n-propylene and isopropylene. Preferably, the alkylene moiety of $R_4$ has 1 or 2 carbon atoms and, more preferably, it is methylene. The alkylene moiety can have as many substituents as there are available hydrogen atoms to be removed from a carbon atom. Useful alkylene substituents are the same as those described below in defining the phenyl substituents, but the most preferred substituents for the alkylene moiety are fluoro and alkoxy.

The phenyl moiety of $R_4$ can have from 1 to 5 substituents in any useful substitution pattern. Useful substituents include but are not limited to: halogen groups, such as fluoro, chloro, bromo, and iodo; substituted or unsubstituted alkyl groups having from 1 to 12 carbon atoms, such as methyl, ethyl, isopropyl, t-butyl, n-pentyl and n-propyl, that can be further substituted with any of the substituents listed herein, such as haloalkyl groups including trihalomethyl groups; substituted or unsubstituted alkoxy groups having 1 to 12 carbon atoms, such as methoxy, ethoxy, isopropoxy, n-pentoxy and n-propoxy; cyano; nitro; substituted or unsubstituted aryl groups having 6 to 14 carbon atoms in the aromatic carbocyclic ring, where the ring is as defined above for $R_1$, $R_2$ and $R_3$; substituted or unsubstituted alkyleneoxycarbonyl groups having 2 to 12 carbon atoms, such as methyleneoxycarbonyl, ethyleneoxycarbonyl and i-propyleneoxycarbonyl; substituted or unsubstituted alkylcarbonyloxy groups having 2 to 12 carbon atoms such as methylenecarbonyloxy, ethylenecarbonyloxy and isopropylenecarbonyloxy; substituted or unsubstituted alkylcarbonyl groups having 2 to 12 carbon atoms, such as methylenecarbonyl, methylenecarbonyl and isopropylenecarbonyl; amido groups; aminocarbonyl groups; trihalomethyl groups; perfluoroalkyl groups; formyl; mercapto; and substituted or unsubstituted heterocyclic groups having 5 to 14 atoms in the ring that includes one or more nitrogen, sulfur, oxygen or selenium atoms with the remainder being carbon atoms, such as pyridyl, oxazolyl, thiophenyl, imidazolyl, and piperidinyl.

Preferably, $R_4$ contains 0 to 5 substituents on the phenyl moiety, more preferably 1 or 2 substituents. The substituents are either halo groups, substituted or unsubstituted methyl or ethyl groups, or substituted or unsubstituted methoxy or 2-ethoxy groups. More preferably, $R_4$ comprises 1 to 3 $C_1$–$C_4$ alkyl, fluoro, chloro, bromo or methoxy groups, or any combination of these groups on either the alkylene or phenyl moiety.

The use of the particular ammonium ions in which all of $R_1$–$R_3$ are 2-hydroxyethyl groups may result in less odor during imaging the heat-sensitive polymer.

Heat-sensitive polymers comprising quaternary ammonium carboxylates may be readily prepared using many methods that will be obvious to one skilled in the art, including the methods described in WO 01/39985 (herein incorporated by reference in its entirety).

The imaging members of this invention, which may be printing plates, have improved hydrophilicity over other "switchable polymer" processless printing plates described in the literature.

The imaging members of this invention comprise a support and one or more layers thereon that are heat-sensitive. The support can be any self-supporting material including polymeric films, glass, ceramics, metals or stiff papers, or a lamination of any of these materials. The thickness of the support can be varied. In most applications, the thickness should be sufficient to sustain the wear from printing and thin enough to wrap around a printing form. A preferred embodiment uses a polyester support prepared from, for example, polyethylene terephthalate or polyethylene naphthalate, and having a thickness of from about 100 to about 310 $\mu$m. Another preferred embodiment uses aluminum foil having a thickness of from about 100 to about 600 $\mu$m. The support should resist dimensional change under conditions of use.

The support can also be a cylindrical surface having the heat-sensitive polymer composition thereon, and thus being an integral part of the printing press. The use of such imaged cylinders is described for example in U.S. Pat. No. 5,713,287.

The support may be coated with one or more "subbing" layers to improve adhesion of the final assemblage. Examples of subbing layer materials include, but are not limited to, gelatin and other naturally occurring and synthetic hydrophilic colloids and vinyl polymers, such as vinylidene chloride copolymers, known for such purposes in the photographic industry, vinylphosphonic acid polymers, silicon-based sol-gel materials, such as those prepared from alkoxysilanes such as aminopropyltriethoxysilane or glycidoxypropyltriethoxysilane, titanium sol gel materials, epoxy functional polymers, and ceramics. The backside of the support may be coated with antistatic agents and/or slipping layers or matte layers to improve handling and "feel" of the imaging member.

The imaging members have preferably only one heat-sensitive layer that is required for imaging. This hydrophilic layer includes one or more heat-sensitive polymers and a photothermal conversion material, described below, and preferably provides the outer printing surface of the imaging member. Because of the particular polymer or polymers used in the imaging layer, the exposed (imaged) areas of the layer are rendered more oleophilic in nature.

The imaging members may also comprise more than one layer in addition to the layer comprising the crosslinking agent of the invention and a hydrophilic polymer. In one embodiment of the invention, the imaging member may comprise an overcoat, and the photothermal conversion material may be present either in the layer comprising a hydrophilic polymer and the crosslinking agent, as described above, or in the overcoat. Thus, in one exemplary embodiment of the invention, the imaging member is prepared by a method comprising: providing a substrate; coating the substrate with a first layer comprising a hydrophilic polymer and a crosslinking agent comprising one or more ionic groups and a plurality of epoxy groups; coating the first layer with an imaging layer comprising a photothermal conversion material; and imagewise exposing the imaging layer to energy to provide exposed and unexposed areas in the first layer. Examples of plates that would benefit from the use of the crosslinking agent of the invention in the embodiment described above include the plates disclosed in WO 99/37481 and 99/37482. In this multi-layer embodiment of the invention, the hydrophilic polymer may be a heat-sensitive polymer but is not required to be a heat-sensitive polymer. In another embodiment of the invention, the imaging member may comprise a layer underneath the layer comprising a hydrophilic polymer and the crosslinking agent, and the photothermal conversion material may be present either in the layer comprising the polymer and the crosslinking agent, or in the layer underneath. Thus, in one exemplary embodiment of the invention, the imaging member is prepared by a method comprising: providing a substrate; coating the substrate with an imaging layer comprising a photothermal conversion material; coating the imaging layer with a second layer comprising a hydrophilic polymer and a crosslinking agent comprising one or more ionic groups and a plurality of epoxy groups; and imagewise exposing the imaging layer to energy to provide exposed and unexposed areas in the second layer. Examples of plates that would benefit from the use of the crosslinking agent of the invention in the embodiment described above include the plates disclosed in EP 825 021 and EP 844 080. In this multi-layer embodiment of the invention, the hydrophilic polymer may be a heat-sensitive polymer but is not required to be a heat-sensitive polymer.

The heat-sensitive polymers useful in this invention generally have a molecular weight of at least 3,000 Daltons and preferably of at least 20,000 Daltons.

The imaging layer of the imaging member can include one or more of the hydrophilic heat-sensitive polymers of the invention, with or without up to 50 weight % based on total dry weight of the layer of additional binder or polymeric materials that will not adversely affect its imaging properties.

The amount of heat-sensitive polymer or polymers used in the imaging layer is generally at least 0.1 g/m$^2$, and preferably from about 0.1 to about 10 g/m$^2$ dry weight. This generally provides an average dry thickness of from about 0.1 to about 10 $\mu$m.

The imaging layer can also include one or more conventional surfactants for coatability or other properties, dyes or colorants to allow visualization of the written image, or any other addenda commonly used in the lithographic art, as long as the concentrations are low enough so they are inert with respect to imaging or printing properties.

The heat-sensitive imaging layer also includes one or more photothermal conversion materials to absorb appropriate radiation from an appropriate energy source, such as an IR laser, which radiation is converted into heat. Preferably, the radiation absorbed is in the infrared and near-infrared regions of the electromagnetic spectrum. Such materials can be dyes, pigments, evaporated pigments, semiconductor materials, alloys, metals, metal oxides, metal sulfides or combinations thereof, or a dichroic stack of materials that absorb radiation by virtue of their refractive index and thickness. Borides, carbides, nitrides, and carbonitrides are also useful.

One particularly useful pigment is carbon of some form (for example, carbon black). Carbon blacks which are surface-functionalized with solubilizing groups are well known in the art and these types of materials are the photothermal conversion materials used in one preferred embodiment of this invention. In another preferred embodiment of the invention, carbon blacks which are grafted to hydrophilic, nonionic polymers, such as FX-GE-003 (manufactured by Nippon Shokubai), or which are surface-functionalized with anionic groups, such as CAB-O-JET® 200 or CAB-O-JET® 300 (manufactured by the Cabot Corporation) are used as photothermal conversion materials. In an especially preferred embodiment of the invention, the photothermal conversion materials are is a polymer-grafted carbon black which is surface-functionalized with anionic groups.

Useful absorbing dyes for near infrared diode laser beams are described, for example, in U.S. Pat. No. 4,973,572, incorporated herein by reference. Particular dyes of interest are "broad band" dyes, that is those that absorb over a wide band of the spectrum. Mixtures of pigments, dyes, or both, can also be used. Particularly useful infrared radiation absorbing dyes include those illustrated as follows:

IR Dye 1

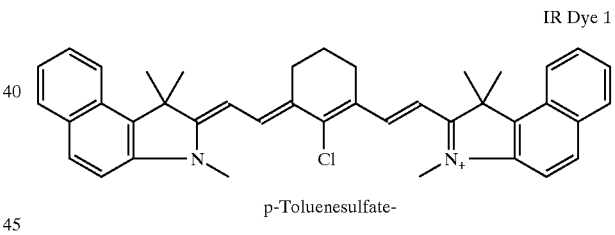

p-Toluenesulfate-

IR Dye 2 Same as Dye 1 but with chloride as the anion.

IR Dye 3

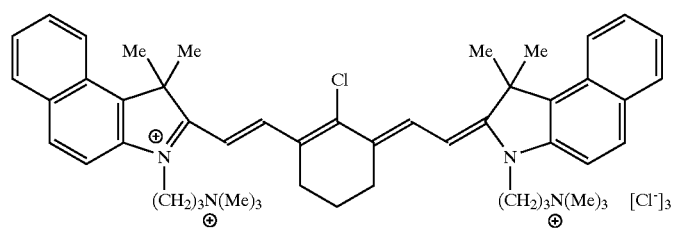

-continued

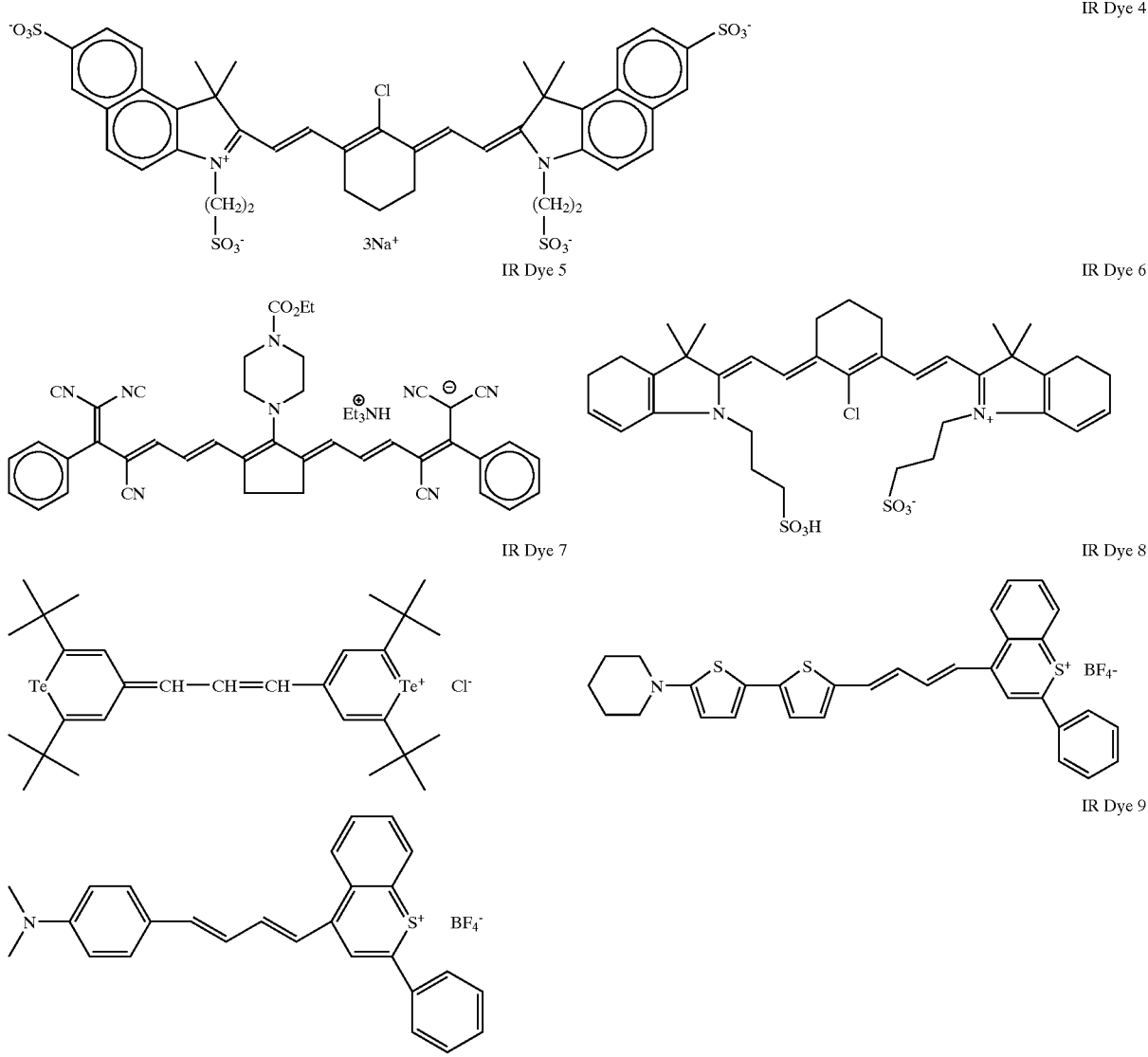

Useful oxonol compounds that are infrared radiation sensitive include Dye 5 noted above and others described in copending U.S. application Ser. No. 09/444,695, filed Nov. 22, 1999.

The photothermal conversion material(s) are generally present in an amount sufficient to provide an optical density of at least 0.3, preferably of at least 0.5, and more preferably of at least 1.0, at the operating wavelength of the imaging laser. The particular amount needed for this purpose would be readily apparent to one skilled in the art, depending upon the specific material used.

Alternatively, a photothermal conversion material can be included in a separate layer that is in thermal contact with the heat-sensitive imaging layer. Thus, during imaging, the action of the photothermal conversion material can be transferred to the heat-sensitive polymer layer without the material originally being in the same layer.

The heat-sensitive composition can be applied to the support using any suitable equipment and procedure, such as spin coating, knife coating, gravure coating, dip coating or extrusion hopper coating. The composition can also be applied by spraying onto a suitable support, such as an on-press printing cylinder, as described in U.S. Pat. No. 5,713,287 discussed above.

The imaging members of this invention can be of any useful form including, but not limited to, printing plates, printing cylinders, printing sleeves and printing tapes, including flexible printing webs. Preferably, the imaging members are printing plates.

Printing plates can be of any useful size and shape, for example, square or rectangular, having the requisite heat-sensitive imaging layer disposed on a suitable support. Printing cylinders and sleeves are known as rotary printing members having the support and heat-sensitive layer in a cylindrical form. Hollow or solid metal cores can be used as substrates for printing sleeves.

During use, the imaging member of this invention is exposed to a suitable source of energy that generates or provides heat, such as a focused laser beam or a thermoresistive head, in the foreground areas where ink is desired in the printed image, typically from digital information supplied to the imaging device. No additional heating, wet processing, or mechanical or solvent cleaning is needed before the printing operation. A laser used to expose the imaging member of this invention is preferably a diode laser, because of the reliability and low maintenance of diode laser systems, but other lasers such as gas or solid state lasers may also be used. The combination of power, intensity and exposure time for laser imaging would be readily apparent to one skilled in the art. Specifications for lasers that emit in the near-IR region, and suitable imaging configurations and devices are described in U.S. Pat. No. 5,339,737, incorporated herein by reference. The imaging member is typically sensitized so as to maximize responsiveness at the emitting wavelength of the laser. For dye sensitization, the dye is typically chosen such that its $\lambda_{max}$ closely approximates the wavelength of laser operation.

The imaging apparatus can operate on its own, functioning solely as a platesetter, or it can be incorporated directly into a lithographic printing press. In the latter case, printing may commence immediately after imaging, thereby reducing press set-up time considerably. The imaging apparatus can be configured as a flatbed recorder or as a drum recorder, with the imaging member mounted to the interior or exterior cylindrical surface of the drum.

In the drum configuration, the requisite relative motion between the imaging device, such as a laser beam, and the imaging member can be achieved by rotating the drum and the imaging member mounted thereon about its axis, and moving the imaging device parallel to the rotation axis, thereby scanning the imaging member circumferentially so the image "grows" in the axial direction. Alternatively, the thermal energy source can be moved parallel to the drum axis and, after each pass across the imaging member, increment angularly so that the image "grows" circumferentially. In both cases, after a complete scan by the laser beam, an image corresponding to the original document or picture can be applied to the surface of the imaging member.

In the flatbed configuration, the laser beam is drawn across either axis of the imaging member, and is indexed along the other axis after each pass. Obviously, the requisite relative motion can be produced by moving the imaging member rather than the laser beam.

While laser imaging is preferred in the practice of this invention, imaging can be provided by any other means that provides thermal energy in an imagewise fashion. For example, imaging can be accomplished using a thermoresistive head (thermal printing head) in what is known as "thermal printing", described for example in U.S. Pat. No. 5,488,025, herein incorporated by reference. Thermal print heads which are commercially available include, for example, Fujitsu Thermal Head FTP-040 MCS001 and TDK Thermal Head F415 HH7-1089.

Without the need for any wet processing after imaging, printing can then be carried out by applying a lithographic ink and fountain solution to the imaging member printing surface, and then transferring the ink to a suitable receiving material, such as cloth, paper, metal, glass or plastic, to provide a desired impression of the image thereon. If desired, an intermediate "blanket" roller can be used to transfer the ink from the imaging member to the receiving material. The imaging members can be cleaned between impressions, if desired, using conventional cleaning means.

The following examples illustrate the practice of the invention, and are not meant to limit it in any way.

EXAMPLES

Preparative Examples 1–7

Preparation of Epoxy Resin 1: Resin with Average Molecule Containing 5.3 Epoxy Units and 1.0 Trimethylalkylammonium Units.

10.0 g DENACOL® EX-521 epoxy resin (Nagase Chemicals) was combined with 75 ml methanol and 0.96 g trimethylamine hydrochloride in a 250 ml 2-neck round bottom flask fitted with a reflux condenser and a nitrogen inlet. The reaction was heated for 16 hours at 40° C. at which point analysis no trimethylamine could be detected by headspace gas chromatography. In addition, the $^1$H NMR spectrum showed complete disappearance of the trimethylamine protons and a proportional disappearance of a fraction of the oxirane protons at δ 2–5–2.8 ppm. In addition, proportional growth of a resonance at δ 2.75 ppm was assigned to the $^+$N—CH$_3$ protons. Some of the solvent was removed by rotary evaporation and the resin was stored as solution of 21.17% solids in methanol.

Preparation of Epoxy Resin 2: Resin with Average Molecule Containing 4.3 Epoxy Units and 2.0 Trimethylalkylammonium Units The procedure of example 1 was followed except that 1.91 g trimethylamine hydrochloride was used. Similar $^1$H NMR trends were observed and were consistent with the proposed structure of the resin. The resin was stored as a solution of 22.45% in methanol.

Preparation of Epoxy Resin 3: Resin with Average Molecule Containing 3.3 Epoxy Units and 3.0 Trimethylalkylammonium Units The procedure of example 1 was followed except that 2.87 g trimethylamine hydrochloride was used. Similar $^1$H NMR trends were observed and were consistent with the proposed structure of the resin. The resin was stored as a solution of 24.53% in methanol.

Preparation of Epoxy Resin 4: Resin with Average Molecule Containing 3.3 Epoxy Units and 3.0 Alkylthiosulfate Units 20.0 g DENACOL® EX-521 epoxy resin (obtained from Nagase Chemicals) was combined with 115 ml methanol in a 250 ml 3-neck round bottom flask fitted with a reflux condenser, addition funnel, pH meter, and a nitrogen inlet. 14.9 g sodium thiosulfate pentahydrate was added all at once and 20 ml of 1.0 N methanolic hydrochloric acid was added via the addition funnel as needed whenever the pH rose over ~11.5. The addition was completed over 45 minutes. The reaction was allowed to stir for an additional hour at 40° C. A small amount of precipitate (NaCl) was removed by filtration and the product was stored as a solution of 19.70% solids in methanol with a final pH of 11.6. Analysis by $^1$H NMR showed a decrease in the integration of the oxirane protons proportional to the amount of thiosulfate added.

Preparation of Epoxy Resin 5: Resin with Average Molecule Containing 3.3 Epoxy Units and 3.0 Alkylsulfonate Units 20.0 g DENACOL® EX-521 epoxy resin (obtained from Nagase Chemicals) was combined with 27.5 methanol, 82.5 g water, 6.2 g sodium bisulfite, and 1.6 g lithium iodide in a 250 ml 3-neck round bottom flask fitted with a reflux condenser and a nitrogen inlet. The reaction solution was bubble degassed with nitrogen for 10 minutes and allowed to stir for 16 hours at 50° C., at which point the pH had changed from 7.8 to 11.0. The solvents were stripped by rotary evaporation and the clear oil was redissolved in methanol. A small amount of a white powder (LiI) was filtered off and the product resin was stored as a solution in methanol of 15.7% solids. Analysis by $^1$H NMR showed a decrease in the integration of the oxirane protons proportional to the amount of bisulfite added and the appearance of a broad, multimodal peak at δ 2.95–3.18 ppm pertaining to protons adjacent to the newly introduced sulfonate units.

Preparation of Epoxy Resin 6: Resin with Average Molecule Containing 5.3 Epoxy Units and 1.0 Trimethylalkylammonium Units 10.0 g DENACOL® EX-521 epoxy resin (obtained from Nagase Chemicals) was combined with 75 ml methanol and 0.96 g trimethylamine hydrochloride in a 250 ml 2-neck round bottom flask fitted with a reflux condenser and a nitrogen inlet. The reaction was heated for 16 hours at 40° C. at which point analysis no trimethylamine could be detected by headspace gas chromatography. In addition, the $^1$H NMR spectrum showed complete disappearance of the trimethylamine protons and a proportional disappearance of a fraction of the oxirane protons at δ 2–5–2.8 ppm. In addition, proportional growth of a resonance at δ 2.75 ppm was assigned to the $^+$N—CH$_3$ protons. Some of the solvent was removed by rotary evaporation and the resin was stored as solution of 21.17% solids in methanol.

Preparation of Epoxy Resin 7: Resin with Average Molecule Containing 1 Epoxy Unit and 5.3 Alkylthiosulfate Units 50.0 g DENACOL® EX-521 epoxy resin (obtained from Nagase Chemicals) was combined with 250 ml methanol in a 1000 ml 3-neck round bottom flask fitted with a reflux condenser, addition funnel, pH meter, and a nitrogen inlet. 12.4 g sodium thiosulfate pentahydrate was added all at once and 50 ml of 1.0 N methanolic hydrochloric acid was added via the addition funnel as needed whenever the pH rose over ~11.5. The addition was completed over 45 minutes. The reaction was allowed to stir for an additional hour at 40C. A white precipitate (NaCl) was removed by filtration and the product was stored as a solution of 19.8% solids in methanol with a final pH of 11.6. Analysis by 1H NMR showed a decrease in the integration of the oxirane protons proportional to the amount of thiosulfate added.

Coating Formulations Examples

Examples 1–4

Three coating formulations were prepared as detailed in Table 1:

TABLE 1

Coating formulations in parts by weight.

| Ingredient | Example 1 | Example 2 | Example 3 | Example 4 (comparative) |
|---|---|---|---|---|
| poly(acrylic acid) | 0.614 | 0.614 | 0.614 | 0.614 |
| Benzyltrimethylammonium hydroxide (40%) | 3.564 | 3.564 | 3.564 | 3.564 |
| FX-GE-003* | 2.040 | 2.040 | 2.040 | 2.040 |
| Epoxy Resin solution 1 | 1.980 | — | — | — |
| Epoxy Resin solution 2 | — | 1.805 | — | — |
| Epoxy Resin-solution 3 | — | — | 1.971 | — |
| CR-5L** | — | — | — | 0.408 |
| Lodyne 103A*** | 0.003 | 0.003 | 0.003 | 0.003 |
| n-propanol | 6.418 | 6.593 | 6.427 | 7.990 |
| Water | 85.381 | 85.381 | 85.381 | 85.381 |

*FX-GE-003 is an ethanolic carbon dispersion obtained from Nippon Shokubai (Osaka, Japan).
**CR-5L is a water-soluble multifunctional aliphatic non-ionic epoxide available from Esprix Technologies.
***Lodyne 103A is a fluorosurfactant available from Ciba Specialty Chemicals.

The formulations in Table 1 were coated onto grained, anodized aluminum and dried. The resulting printing plates were imaged on a Creo 3230 Trendsetter at 300, 400 and 500 mJ/cm$^2$ (15W). The imaged plates were mounted directly without processing on a Miehle printing press and 35,000 prints were made using Gans Mach 1 Process Black Ink and a fountain solution formulated with Litho Etch 142W and PAR according to the manufacturer's (VARN) directions. After about 20,000 impressions the plate prepared according to comparative Example 4 began printing lightly in the background, and the background sensitivity became progressively worse. The plates of the present invention from Examples 1–3 showed no background sensitivity through the end of the print run.

Examples 5–7

Three coating formulations were prepared as detailed in Table 2:

TABLE 2

Coating formulations in parts by weight.

| Ingredient | Example 5 | Example 6 | Example 7 (Comparative) |
|---|---|---|---|
| poly(acrylic acid) | 0.614 | 0.614 | 0.614 |
| benzyltrimethylammonium hydroxide (40%) | 3.564 | 3.564 | 3.564 |
| FX-GE-003 | 2.040 | 2.040 | 2.040 |
| Epoxy Resin solution 4 | 2.071 | — | — |
| Epoxy Resin solution 5 | — | 2.071 | — |
| CR-5L | — | — | 0.204 |
| Lodyne 103A | 0.003 | 0.003 | 0.003 |
| n-propanol | 6.327 | 6.327 | 8.011 |
| water | 85.381 | 85.381 | 85.564 |

The formulations in Table 2 were coated onto grained, anodized aluminum and dried. The resulting printing plates were imaged on a Creo 3230 Trendsetter at 350 and 450 mJ/cm$^2$ (15W). The imaged plates were mounted directly without processing on a Miehle printing press and 5,000 prints were made using Graphic Equinox Process Black Ink and a fountain solution formulated with Litho Etch 142W and PAR according to the manufacturer's (VARN) directions. After about 1,000 impressions the plate prepared according to comparative Example 7 began printing lightl in the background, and the background sensitivity became progressively worse. The plates of the present invention from Examples 5–6 showed no background sensitivity through the end of the print run.

Example 8

A coating formulation was prepared as detailed in Table 3:

TABLE 3

Coating formulation in parts by weight.

| Ingredient | Example 8 |
| --- | --- |
| quaternary ammonium salt polymer* | 2.040 |
| benzyltrimethylammonium hydroxide (40%) | 0.092 |
| FX-GE-003 | 2.040 |
| Epoxy Resin solution 4 | 1.445 |
| Lodyne 103A | 0.003 |
| n-propanol | 6.852 |
| water | 87.528 |

*Poly(vinylbenzyltrimethylammonium chloride-co-methacrylic acid) (95:5 molar ratio)

The formulation in Table 3 was coated onto grained, anodized aluminum and dried. The resulting printing plates were imaged on a Creo 3230 Trendsetter at 300, 400 and 500 mJ/cm$^2$ (15W). The imaged plates were mounted directly without processing on an A. B. Dick printing press and 200 prints were made using Vanson Rubber Base Plus black Ink and a fountain solution formulated with Litho Etch 142W and PAR according to the manufacturer's (VARN) directions.

Example 9

A coating formulation was prepared as detailed in Table 4:

TABLE 4

Coating formulation in parts by weight.

| Ingredient | Example 9 |
| --- | --- |
| 80/20 copolymer of methyl methacrylate and sodium vinylbenzylthiosulfate | 3.437 |
| IR dye 3* | 0.510 |
| Epoxy Resin solution 7 | 2.396 |
| Lodyne 228M** | 0.019 |
| Acetone | 47.779 |
| Methanol | 21.968 |
| Water | 23.890 |

*IR Dye 3 prepared according to US 6,248,886 has the following structure:

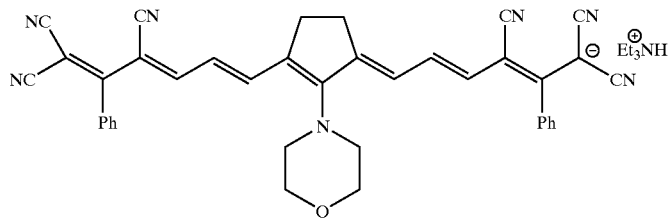

**Lodyne 228M is a fluorosurfactant from Ciba Specialty Chemicals.

The formulation in Table 4 was coated onto grained, anodized aluminum and dried. The resulting printing plate was imaged on a Creo 3230 Trendsetter at 300 mJ/cm$^2$ (15W). The imaged plate was mounted directly without processing on an A.B. Dick 360 printing press and 100 prints were made using Vanson Rubber Base Plus black ink and a fountain solution formulated with Litho Etch 142W and PAR according to the suggestions of the manufacturer (VARN).

Example 10 (Hypothetical)

This example demonstrates the use of an ionic epoxy compound in the hydrophilic top layer of the two-layer printing plate described in Example 5 of U.S. Pat. No. 6,090,524

A grained anodized aluminum support is coated to a dry coating weight of 175 mg/ft$^2$ with a 1:1.5 dispersion of Cabot Black Pearls 700 and nitrocellulose (10 cps viscosity from Hercules Corporation) in methyl ethyl ketone. The resulting coating is overcoated to a dry coating weight of 85 mg/ft$^2$ with an aqueous mixture of 10 parts NALCO® 2326 colloidal silica, 1 part 3-aminopropyltriethoxysilane, 0.4 parts of Cab-O-Jet 200 carbon dispersion (available from Cabot corporation), 40 parts of Epoxy solution 7 and 0.05 parts of Zonyl FSN (a fluorocarbon surfactant available from Du Pont). The resulting printing plate is imaged on a Creo 3230 Trendsetter at 300 mJ/cm$^2$ (15 W). The imaged plate is mounted directly without processing on an A.B. Dick 360 printing press and 100 prints are made using Vanson Rubber Base Plus black ink and a fountain solution formulated with Litho Etch 142W and PAR according to the suggestions of the manufacturer (VARN).

Example 11 (Hypothetical)

A hydrophilic sub-coating formulation is prepared as described in Table 5.

TABLE 5

Coating formulation in parts by weight.

| Ingredient | Amount |
| --- | --- |
| 25% poly(acrylic acid) in water | 0.250 |
| Sodium hydroxide | 0.035 |
| Epoxy Resin solution 1 | 0.295 |
| Lodyne 103A | 0.004 |
| Water | 99.416 |

The formulation is applied to a grained and anodized aluminum substrate and dried to a film weight of about 0.03 g/m². Onto this coated substrate is formed an imaging layer by applying at a dry film weight of about 1.5 g/m² the formulation described in Table 6.

TABLE 6

Composition of imaging formulation in parts by weight.

| Ingredient | Amount |
| --- | --- |
| Cresol-formaldehyde novolac resin | 4.940 |
| IR dye[1] | 0.065 |
| α-naphthoflavone | 1.085 |
| Oxonol 595[2] | 0.100 |
| BYK-307[3] | 0.011 |
| Acetone | 6.288 |
| 1-methoxy-2-propanol | 87.511 |

[1]2-[2-[2-chloro-3-[(1,3-dihydro-1,1,3-trimethyl-2H-benz[e]indol-2-ylidene)ethylidene]-1-cyclohexen-1-yl]ethenyl]-1,1,3-trimethyl-1H-benz[e]indolium, salt with 4-methylbenzenesulfonic acid.
[2]Oxonol 595² is a dye obtained from Aldrich.
[3]BYK-307 is a polyether-modified polydimethylsiloxane available from BYK-Chemie.

The resulting plate is imaged at 830 nm and processed with Goldstar developer (available from Kodak Polychrome Graphics) to produce a positive image.

Although the present invention has been described in connection with specific exemplary embodiments, it should be understood that various changes, substitutions and alterations can be made to the disclosed embodiments without departing from the spirit and scope of the invention as set forth in the appended claims.

We claim:

1. A coating composition comprising:
   (a) a hydrophilic polymer;
   (b) a crosslinking agent comprising one or more ionic groups and a plurality of epoxy groups; and
   (c) a photothermal conversion material.

2. The coating composition of claim 1, wherein the one or more ionic groups of the crosslinking agent are cationic groups.

3. The coating composition of claim 2, wherein the cationic groups are the same or different organophosphonium moieties, the same or different organosulfonium moieties, the same or different organoammonium moieties, or the same or different N-alkylated positively charged nitrogen-containing heterocyclic moieties.

4. The coating composition of claim 1, wherein the one or more ionic groups of the crosslinking agent are anionic groups.

5. The coating composition of claim 4, wherein the anionic groups are the same or different sulfonate or thiosulfate groups.

6. The coating composition of claim 1, wherein the plurality of epoxy groups and the one or more ionic groups of the crosslinking agent are in a ratio ranging from about 19:1 to about 1:19.

7. The coating composition of claim 1, wherein the hydrophilic polymer comprises thiosulfate groups.

8. The coating composition of claim 1, wherein the hydrophilic polymer comprises carboxylate groups and a backbone, wherein the carboxylate groups are linked either directly or indirectly to the polymer backbone.

9. The coating composition of claim 1, wherein the hydrophilic polymer comprises quaternary ammonium carboxylate groups and a backbone, wherein the carboxylate groups are linked either directly or indirectly to the polymer backbone, and the quaternary ammonium groups comprise at least one substituted alkylene($C_1$–$C_3$)-phenyl group.

10. The coating composition of claim 9, wherein the hydrophilic polymer comprises at least 1 mole of quaternary ammonium carboxylate groups per 1000 g of polymer.

11. The coating composition of claim 1, wherein the hydrophilic polymer is represented by Structure 1 below wherein "A" represents recurring units derived from ethylenically unsaturated polymerizable monomers, $R_1$, $R_2$ and $R_3$ are independently alkyl or aryl groups, or any two or all three of $R_1$, $R_2$ and $R_3$ can be combined to form one or two heterocyclic rings with the quaternary nitrogen atom, $R_4$ is a substituted alkylenephenyl group in which the alkylene portion has 1 to 3 carbon atoms, and B represents noncarboxylated recurring units, m is 0 to about 75 mol %, n is from about 25 to 100 mol %, and y is 0 or 1.

Structure 1

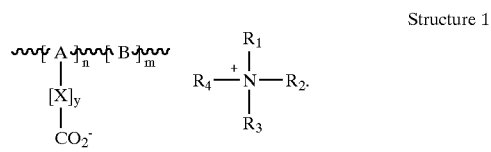

12. The coating composition of claim 1 wherein the photothermal conversion material is a carbon black.

13. The coating composition of claim 12, wherein the carbon black is a polymer-grafted carbon black, an anionic surface-functionalized carbon black, or a polymer-grafted, anionic surface-functionalized carbon black.

* * * * *